March 21, 1967   L. S. KRAFT, JR   3,310,161
TURN CONVEYOR
Filed March 31, 1965
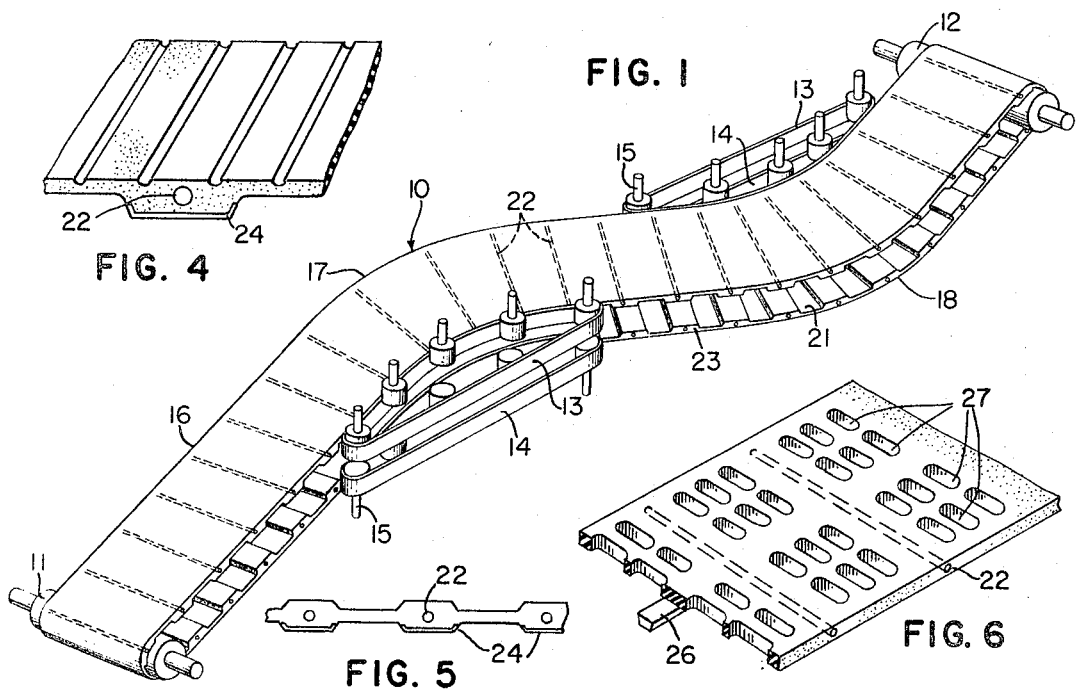
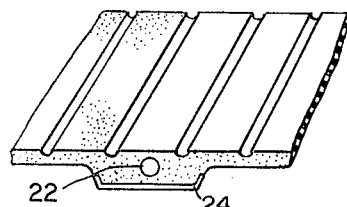
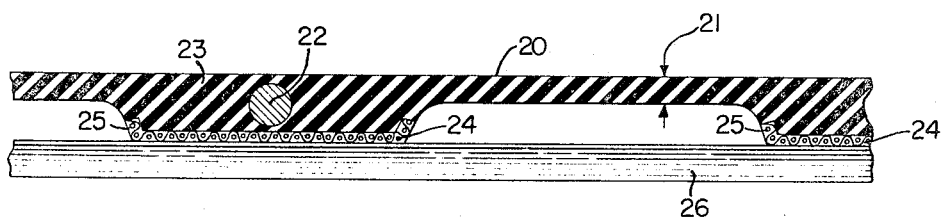
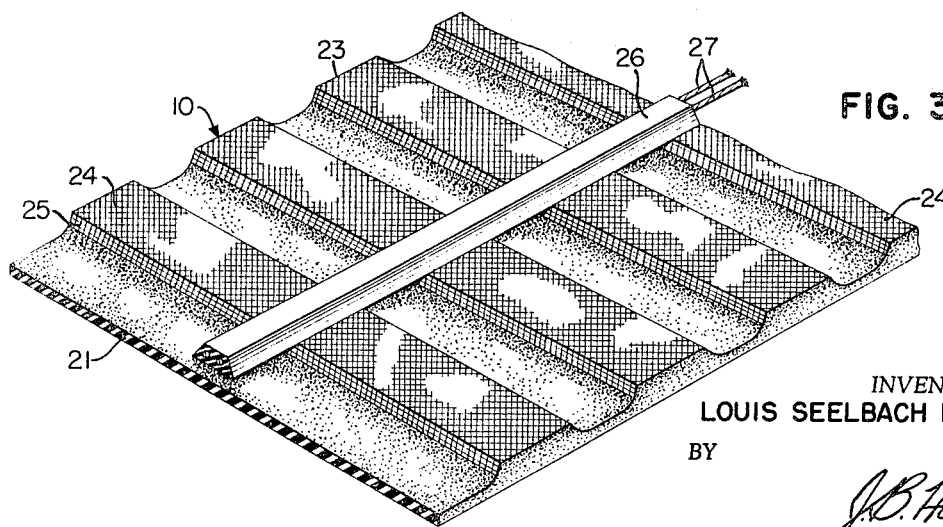
INVENTOR.
LOUIS SEELBACH KRAFT, JR.
BY
J.B. Holden
ATTORNEY

United States Patent Office 3,310,161
Patented Mar. 21, 1967

3,310,161
TURN CONVEYOR
Louis Seelbach Kraft, Jr., Cuyahoga Falls, Ohio, assignor to The Goodyear Tire & Rubber Company, Akron, Ohio, a corporation of Ohio
Filed Mar. 31, 1965, Ser. No. 444,131
7 Claims. (Cl. 198—193)

The present invention relates to conveyor belts and in particular relates to a conveyor belt adapted to move along a curved path.

In many operations it is desirable to have a conveyor belt that can carry articles such as raw materials and packages in non-linear directions. The majority of conveyor systems are designed to move in a linear direction and cannot negotiate horizontal, vertical or spiral curves. This problem has heretofore been solved by coupling together a series of linear belts so that the transported material traverses a horizontal curve in a cascade fashion.

Belts have been designed to move through a horizontal curve; however, the belt and associated support structure limits the movement of the belt to curvilinear motion only.

Also belts have been designed to move through horizontal curves and straight runs all in the same flight; however, such belts are constructed of wire mesh or other movable mechanisms that limit the type of material that can be transported thereover. An additional undesirable feature of the prior art belts has been the relatively heavy weight and noise of operation which are undesirable in that greater power is required for driving the belt and noise can be a nuisance in public installations.

It is an object of the present invention to provide a conveyor belt that can negotiate a non-linear path. It is an additional object of this invention to provide a conveyor belt that is light weight and quiet in operation. It is another object of this invention to provide a conveyor belt that can negotiate right and left horizontal turns as well as vertical and spiral curves. A still further object of the present invention is to provide a conveyor belt that can pass over a curved and straight path while maintaining an uninterrupted top belt surface. These and other objects of the present invention will be readily apparent from the following description in connection with the accompanying drawings in which:

FIG. 1 is a perspective view showing the conveyor oriented along a curvilinear path.

FIG. 2 is an enlarged cross-section of the belt taken through the direction of travel.

FIG. 3 is an enlarged perspective showing the construction of the belt from the under side.

FIG. 4 is a perspective view showing another belt surface configuration.

FIG. 5 is a perspective view illustrating a modification of the invention.

FIG. 6 is a perspective view illustrating another modification of the invention.

Referring to FIG. 1 the conveyor is shown in its working position; however, all the support structure has not been shown since it is not considered a part of this invention. The conveyor of the present invention is represented at 10 and comprises a belt extending in a longitudinal direction. Support rollers 11 and 12 are shown at the ends of the belt flight. Either 11 or 12 or both may be used to supply power for driving belt 10. The belt is trained over rollers 11 and 12 and is spliced together to form a continuous movable band. In order to move around horizontal curves, support structure such as edge bands 13 and 14 are utilized in cooperation with small vertically oriented rollers 15.

The conveyor belt can move in a linear direction as shown at 16, then flow evenly in a horizontal fashion around right turns such as 17 and left turns such as 18. It is also possible to incline the entire system so that roller 12 is at a higher elevation than roller 11. Thus it is apparent that the belt can negotiate an incline as well as lateral curves. By supplying hold down rolls on the top edges the belt can also travel over vertical and spiral curves.

FIG. 2 is an enlarged cross-section of the conveyor belt taken through a representative length thereof. The main body 20 of the belt is formed from an elastomer such as rubber, polyurethane, or other materials exhibiting similar properties. The top surface of the belt has continuity in the longitudinal as well as the lateral direction thus enabling small articles to be satisfactorily transported. As shown in FIG. 4, the upper or top surface of belt 10 may be corrugated to prevent the movement of articles relative to the belt when the belt is in an inclined position. The belt can be of varying thicknesses along its longitudinal span. At 21 the thickness of the elastomer is reduced to provide the necessary elongation as belt 20 moves around curves over the belt course shown in FIG. 1. The thickness at 21 is so regulated with respect to the spacing of the reinforcement members, which will be discussed later, that the rubber can compress without undue buckling occurring. Thickness 21 is preferably between 10 and 60 percent of the overall thickness of section 23. As seen in FIGS. 2 and 3, the thin section 21 may have its top surface flush with the adjacent thick sections 23 or thin section 21 may be positioned more centrally between the top and bottom surfaces of thick section 23 as seen in FIG. 5.

Reinforcement members 22 in the form of rods are spaced transversely of the belt in order to maintain a flat top surface as the belt progresses around the curved portions of its run. Rods 22 are imbedded in thickened sections 23 as shown in FIG. 2. The number and size of stiffening members 22 may be varied over a substantial range depending on the arc through which the belt traverses since the primary function of members 22 is to provide the belt with sufficient transverse rigidity to eliminate buckling of the belt and therefore a tendency to raise up on the exterior arcs of the curvilinear portions of the run.

Thickened sections 23 are also coupled with a hard duck fabric, or similar material, 24 adhered to the bottom edges of belt 10. The fabric areas 24 serve as a sliding surface for the conveyor bed over which the belt passes. The forward and trailing edges of fabric 24 may be turned upward as shown at 25 so that the fabric will not catch on the belt support apparatus.

FIG. 3 shows a relatively inelastic structural member 26 positioned along the center of belt 10 and attached thereto by adhesive bonding or mechanical attachment means such as rivets. Member 26 is of elastomeric construction similar to belt 10; however, it need not be the same identical material as from which belt 10 is constructed. It has been found that member 26 can be conveniently adapted to its conveyor support system if it is of trapezoidal configuration as shown in FIG. 3. It is, of course, always possible to utilize other configurations of member 26 if desired. Contained within member 26 is a relatively inextensible reinforcing cord element such as depicted at 27. Wire or non-metallic substances such as nylon or glass strands may be used. Reinforcing element 27, which may be a single reinforcement cord or a plurality of such cords, is employed to prevent an overall elongation of the belt. Reinforcing elements 27 may also be positioned anywhere within the belt structure so long as they are in the center of the belt width. When the belt is so restricted along its center line one lateral edge can expand and the correspondingly opposite edge can contract relative to the center section of the belt thus facilitating the negotiation of a curved conveyor path. Member 26 not only aids in maintaining the overall length of the belt constant, it also counteracts some of the side thrust that normally would be imposed upon the edges of the belt as a lateral curve is negotiated. The belt can operate in the above described fashion or it can operate in the following manner. The reinforcing elements 27 are capable of elongation to a certain extent. This causes the belt to be in tension throughout; therefore, when a curve is negotiated one edge of the belt will further elongate while the opposite edge will relax and pass into a state of less tension, no tension, or perhaps even some compression.

An additional embodiment of the present invention is described below and shown in FIG. 6. Instead of manufacturing the belt with thin sections such as 21, the belt is made of uniform thickness and the overall elasticity is acquired by placing a series of openings 27 through the belt. Several such openings when placed side by side and positioned across the entire belt width would produce a belt equivalent to one containing thin strips 21.

The above set forth conveyor belt provides a means of conveying articles in a rapid and efficient manner over a non-linear and even a non-planar conveyor flight. The belt with its unique construction is permitted to travel around the curves by a turning action that is very similar to the guiding mechanism for an ordinary snow sled. In addition the belt can be of very lightweight construction which minimizes the power requirements for moving it over its prescribed course.

While certain representative embodiments and details have been shown for the purpose of illustrating the invention, it will be apparent to those skilled in this art that various changes and modifications may be made therein without departing from the spirit or scope of the invention.

What is claimed is:

1. A flexible endless conveyor belt of elastomeric composition comprising a web with a relatively planar top surface and a non-planar bottom surface, said belt having positioned along its longitudinal extent thick sections and thin sections, said thick sections extending transversely across the belt and containing at least one transversely extending relatively rigid reinforcement member therein, said thin sections being interdisposed between said thick sections and extending across the entire width of the belt thus permitting the belt to elongate along one-half while contracting along the corresponding opposite half, at least one relatively inextensible reinforced member positioned in the central portion of said belt and having continuity throughout the entire length of the belt to prevent an overall elongation of the belt as it traverses a laterally curved path.

2. A flexible endless conveyor belt of elastomeric composition comprising a web with a relatively planar top surface and a non-planar bottom surface, said belt having positioned along its longitudinal extent thick sections and thin sections, said thick sections extending transversely across the belt and containing imbedded therein at least one rigid reinforcing member, said thick sections also containing adhered on the bottom surface thereof a non-elastic material for contacting the surface over which the belt moves, said thin sections being alternately interdisposed between said thick sections thus permitting the belt to elongate along one-half while contracting along the corresponding opposite half, at least one relatively inextensible cord reinforced member attached to the bottom of said belt and having continuity throughout the entire length of the belt to prevent an overall elongation of the belt as it traverses a laterally curved path.

3. A flexible endless conveyor belt of elastomeric composition comprising a continuous web with a flat top surface and a non-planar bottom surface, said belt having positioned along its longitudinal extent thick sections and thin sections, said thick sections extending transversely across the belt and containing imbedded therein at least one rigid reinforcing member that extends substantially over the entire lateral extent of the belt, said thick sections also containing adhered on the bottom surface thereof a continuous non-elastic material for contacting the surface over which the belt moves, said thin sections being alternately interdisposed between said thick sections and of uniform thickness throughout thus permitting the belt to elongate along one-half while contracting along the corresponding opposite half, at least one relatively inextensible cord reinforced member of trapezoidal configuration intermittently attached to the bottom of said belt and having continuity throughout the entire length of the belt to prevent an overall elongation of the belt as it traverses a laterally curved path.

4. A flexible endless conveyor belt of rubber composition comprising a continuous web with a smooth planar top surface and a non-planar bottom surface, said belt having positioned along its longitudinal extent thick sections and thin sections, said thick sections extending transversely across the belt and containing therein a rigid reinforcing member that extends uninterrupted substantially over the entire lateral extent of the belt, said thick sections also containing adhered on the bottom surface thereof a non-elastic material for contacting the surface over which the belt moves, said material having the forward and trailing edges thereof angling toward the top surface of the web, said thin sections being alternately interdisposed between said thick sections and of uniform thickness throughout thus permitting the belt to elongate along one-half while contracting along the corresponding opposite half, at least one relatively inextensible cord reinforced member of trapezoidal configuration intermittently attached to the bottom of said belt and having continuity throughout the entire length of the belt to prevent an overall elongation of the belt as it traverses a laterally curved path, said member contacting the bottom of said thick sections and in spaced relationship to the bottom of said thin sections.

5. A belt as claimed in claim 4 wherein the top surface of the belt is corrugated.

6. A flexible endless conveyor belt of elastomeric composition comprising a continuous web with non-planar top and bottom surfaces, said belt having positioned along its longitudinal extent thick sections and thin sections, said thick sections extending transversely across the belt and containing imbedded therein at least one rigid reinforcing member, said thick sections also containing adhered on the bottom surface thereof a non-elastic material for contacting the surface over which the belt moves, said thin sections being alternately interdisposed between said thick sections so that the top surface of said thin sections is below the top surface of said thick sections and the bottom of said thin sections is above the bottom surface of said thick sections, thus permitting the belt to elongate along one half while contracting along the corresponding opposite half, at least one relatively inextensible cord reinforced member intermittently attached to the bottom of said belt and having continuity throughout the entire length of the belt to prevent an overall elongation of the belt as it traversed a laterally curved path.

7. A flexible endless conveyor belt of elastomeric composition comprising a web with a planar top surface, said belt having positioned along its longitudinal direction relatively inextensible sections and extensible sections, said extensible sections being interdisposed across the entire width of the belt between said inextensible sections, said extensible sections containing a plurality of apertures, said inextensible sections containing adhered on the bottom surface thereof a non-elastic material for contacting the surface over which the belt moves, said inextensible sections also containing transversely oriented relatively rigid reinforcing members, at least one relatively inextensible reinforced member positioned in the central portion of the belt and having continuity throughout the entire length of the belt to prevent an overall excessive elongation of the belt as it traverses a curved path.

References Cited by the Examiner

UNITED STATES PATENTS

| | | | |
|---|---|---|---|
| 581,770 | 5/1897 | Reeves | 198—193 |
| 1,285,465 | 11/1918 | Tewksbury | 198—193 X |
| 2,305,044 | 12/1942 | Toews | 198—198 |
| 2,514,429 | 7/1950 | Waugh | 198—198 X |
| 3,237,754 | 3/1966 | Freitag et al. | 198—182 |

FOREIGN PATENTS 1,194,320  4/1963  Germany.

EVON C. BLUNK, *Primary Examiner.*

M. L. AJEMAN, *Assistant Examiner.*